United States Patent
Han et al.

(10) Patent No.: US 8,391,592 B2
(45) Date of Patent: *Mar. 5, 2013

(54) SYSTEM AND METHOD FOR DETECTION OF MULTI-VIEW/MULTI-POSE OBJECTS

(75) Inventors: Feng Han, Trenton, NJ (US); Ying Shan, Sammamish, WA (US); Harpreet Singh Sawhney, West Windsor, NJ (US); Rakesh Kumar, Monmouth Junction, NJ (US)

(73) Assignee: SRI International, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/134,885

(22) Filed: Jun. 20, 2011

(65) Prior Publication Data

US 2012/0002869 A1    Jan. 5, 2012

Related U.S. Application Data

(63) Continuation of application No. 11/762,400, filed on Jun. 13, 2007, now Pat. No. 7,965,886.

(60) Provisional application No. 60/813,055, filed on Jun. 13, 2006.

(51) Int. Cl.
    *G06K 9/62* (2006.01)

(52) U.S. Cl. ............................................... 382/159

(58) Field of Classification Search .................. None
See application file for complete search history.

(56) References Cited

U.S. PATENT DOCUMENTS

| 7,024,033 B2 | 4/2006 | Li et al. | |
|---|---|---|---|
| 2007/0127811 A1* | 6/2007 | Luo | 382/159 |
| 2007/0230792 A1* | 10/2007 | Shashua et al. | 382/190 |

OTHER PUBLICATIONS

"AdaBoost", Jiri Matas and Jan Sochman, Centre for Machine Perception, Czech Technical Universiry, Prague, downloaded from http://www.robots.ox.ac.uk/~az/lectures/cv/adaboost_matas.pdf, no date, 136 pages.

* cited by examiner

*Primary Examiner* — Brian P Werner
(74) *Attorney, Agent, or Firm* — Moser Taboada

(57) ABSTRACT

The present invention provides a computer implemented process for detecting multi-view multi-pose objects. The process comprises training of a classifier for each intra-class exemplar, training of a strong classifier and combining the individual exemplar-based classifiers with a single objective function. This function is optimized using the two nested AdaBoost loops. The first loop is the outer loop that selects discriminative candidate exemplars. The second loop, the inner loop selects the discriminative candidate features on the selected exemplars to compute all weak classifiers for a specific position such as a view/pose. Then all the computed weak classifiers are automatically combined into a final classifier (strong classifier) which is the object to be detected.

19 Claims, 4 Drawing Sheets

SYSTEM AND METHOD FOR DETECTION OF MULTI-VIEW/MULTI-POSE OBJECTS

CROSS-REFERENCE TO RELATED APPLICATIONS

This application is a continuation of co-pending U.S. patent application Ser. No. 11/762,400, filed Jun. 13, 2007 now U.S. Pat. No. 7,965,886, which claims benefit of U.S. Provisional Patent Application No. 60/813,055 filed Jun. 13, 2006. Each of the aforementioned patent applications is herein incorporated in its entirety by reference.

GOVERNMENT RIGHTS IN THIS INVENTION

This invention was made with U.S. government support under contract number NBCHC050078. The U.S. government has certain rights in this invention.

FIELD OF THE INVENTION

The invention relates generally to multi-view multi-pose objects detection system. More specifically, the invention relates to a system and method for providing a novel computational framework for multi-view multi-pose detection utilizing discriminative shape-based exemplars.

BACKGROUND OF THE INVENTION

An object classifier is a technique used for detection and classification of any object (with or without motion) in an image or image patch (region of interest) in real-time. The conventional approach to build such classifier is illustrated in FIG. 1. FIG. 1 shows a plurality of car images (training samples) with various poses and view angles. The conventional method mainly consists of three stages. First, manually separate the training samples into a number of clusters to make sure the samples in each cluster have the same pose and viewing aspect. Second, train a classifier using training samples in each cluster, which can be used to detect objects with the same pose and view-aspect as those of the samples in the cluster. Third, combine all the classifiers obtained above into a final classifier, which can be used to detect objects with multi-pose and multi-view.

There are several shortcomings associated with this conventional approach. First, since the training data set is large, and is usually collected in uncontrolled environments, manually separating them into different clusters can become prohibitively expensive especially with the increase in object variability and the number of object classes. Second, due to the fundamental ambiguity in labeling different poses and viewing aspects, manual clustering is an error-prone procedure that may introduce significant bias into the training process.

Thus, this conventional approach is time-consuming and inherently ambiguous in both defining the categories and assigning samples to each category. So, a need exists in the art to provide for a relatively inexpensive, fast and efficient means for multi-view multi-pose object detection.

SUMMARY OF THE INVENTION

The present invention provides a computational method for detecting multi-view/multi-pose objects such that each object having at least one feature. The method comprises receiving a data set of training samples, such that the samples include images having at least one object; randomly selecting a subset of positive samples from the training samples to create a set of candidate exemplars, such that the positive samples comprise images of the object to be detected. The method also comprises generating at least one weak classifier from the set of candidate exemplars, each classifier being associated with a position of the selected positive training samples. The position comprises a view, a pose, or combinations thereof. The method further comprises training the weak classifiers based on distance values between at least one feature of each of the candidate exemplars and the corresponding at least one feature of the training sample. The method also comprises computing error rates of each of the trained weak classifiers and selecting the trained weak classifier with a lowest error rate. The method further comprises repeating the above steps until all the trained weak classifiers have been selected and combining the selected trained weak classifiers into a final classifier, wherein said final classifier is the object to be detected.

DETAILED DESCRIPTION OF THE INVENTION

Figure 1:
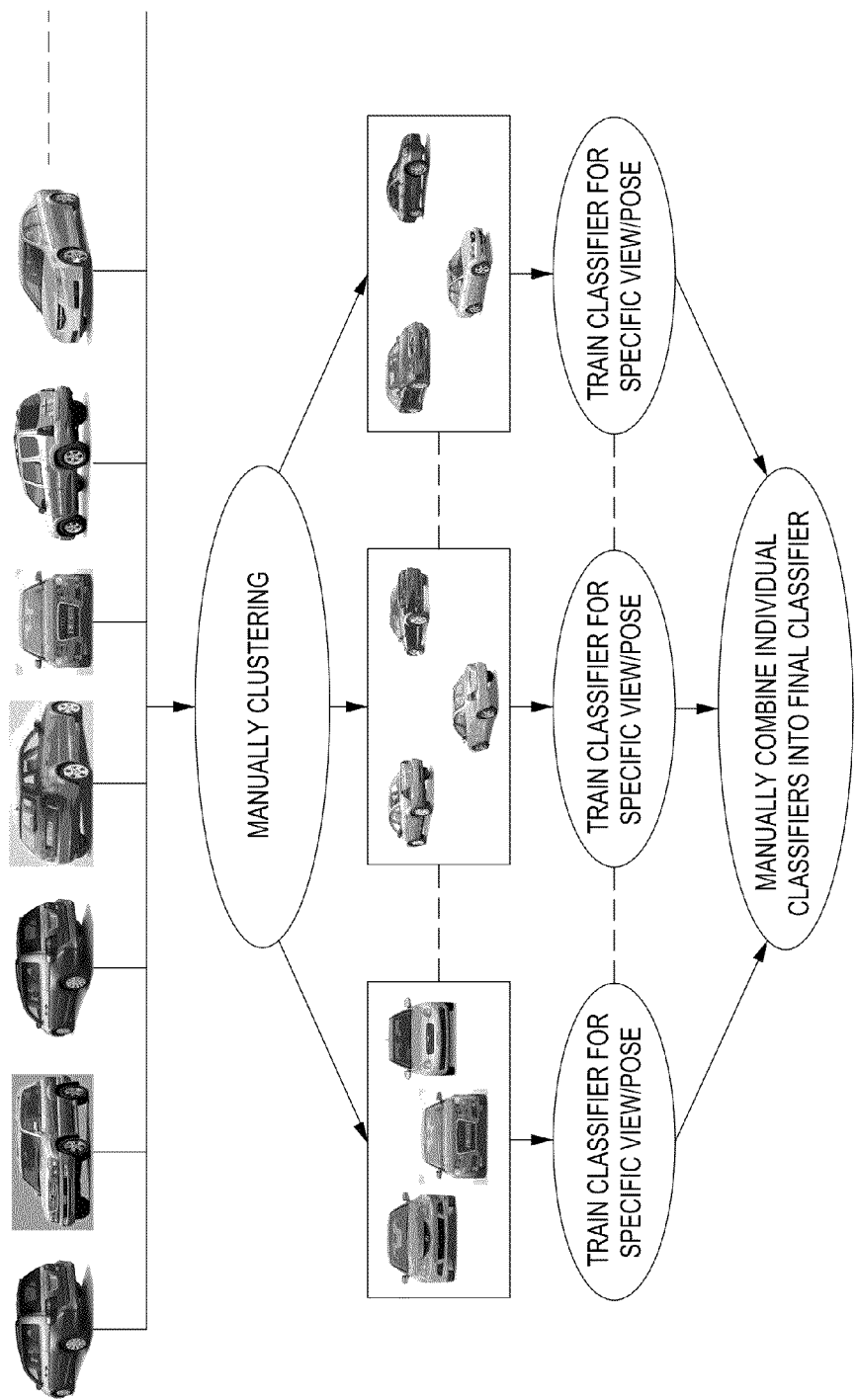
FIG. 1 illustrates a conventional approach for multi-view multi-pose object detection.
Figure 2:
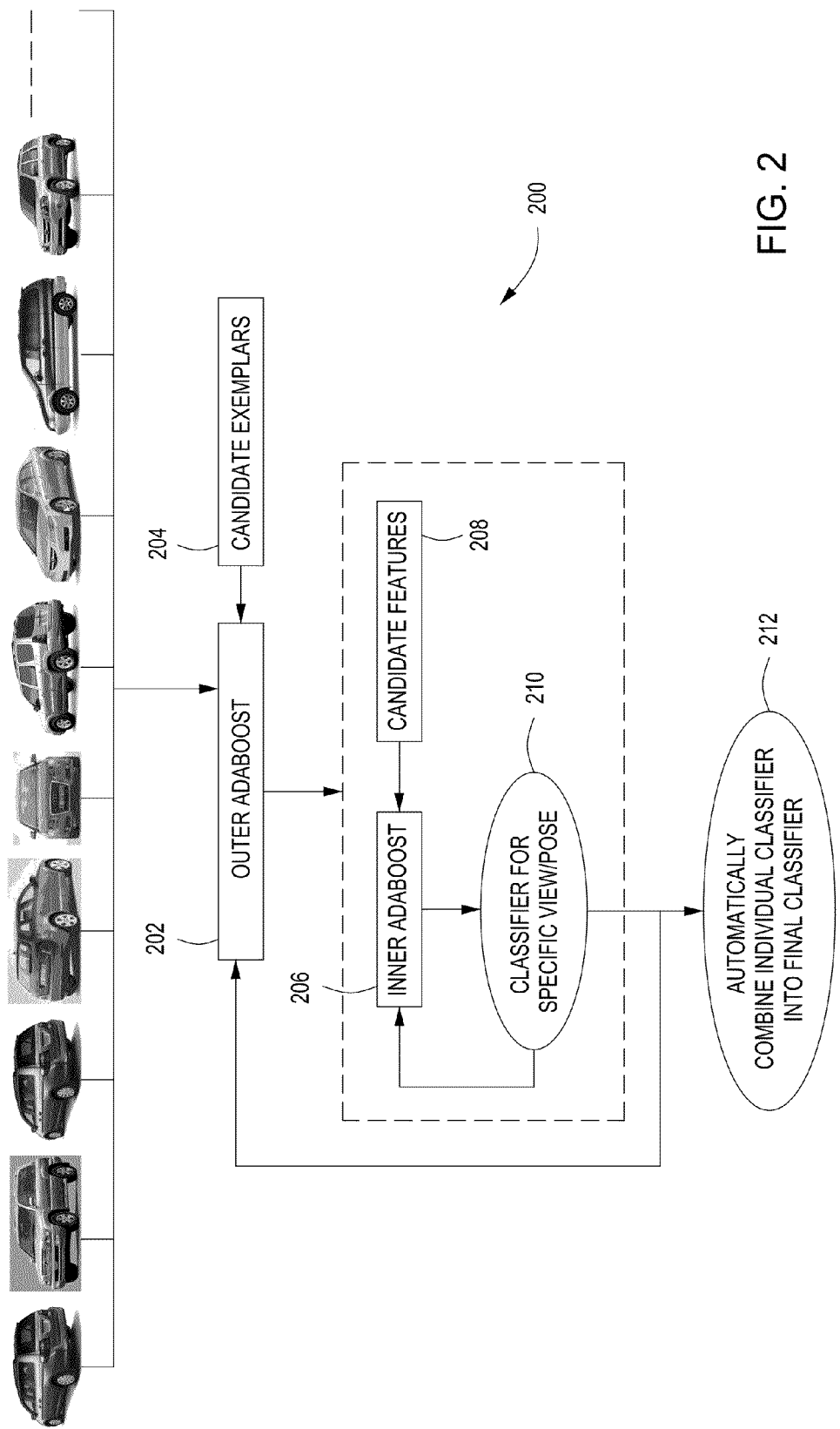
FIG. 2 illustrates a computational framework approach for multi-view multi-pose object detection in accordance with the present invention.

The present invention provides a novel computational framework 200 for multi-view/multi-pose object detection as illustrated in FIG. 2. The framework 200 unifies the three stages through training of a classifier for each intra-class exemplar, training of a strong classifier and combining the individual exemplar-based classifiers with a single objective function. This function is optimized using two nested AdaBoost loops. AdaBoost loop is an algorithm, known in the art, for constructing a "strong" classifier as linear combination of simple "weak" classifiers. The outer AdaBoost loop 202 (Algorithm 1) selects discriminative exemplars from the candidate exemplar set 204, each of which is conceptually equivalent to a manual clustering stage in the conventional approach, and best represents a class of training samples that are similar according to certain distance measures. The inner AdaBoost loop 206 (Algorithm 2) is used to select the discriminative features from the candidate features 208 on the selected exemplars 204 to compute a classifier 210, i.e. a weak classifier, for as specific feature such as view/pose. The inner Adaboost loop 206 is repeated for all the candidate exemplars 204 to compute each individual classifier 210. Then at step 212, the individual classifiers 210, i.e. an exemplar-based weak classifiers are automatically combined into a final classifier 212, i.e. strong classifier.

This novel approach of the present invention replaces the manual time-consuming categorization process in the conventional approach as well as addresses the problem of labeling ambiguity inherent in the process. Also, since the overall framework complies with the original AdaBoost-based object detection framework, the approach of the present invention inherits the computational advantages of the standard approach plus including the novel features of using the exemplar to train the classifier (computed in Algorithm 2) in Algorithm 1. With the classifier generated by the approach in this invention, one can detect people, vehicles and other objects in images or videos when they appear with different poses and in different view-aspects.

Figure 3A:
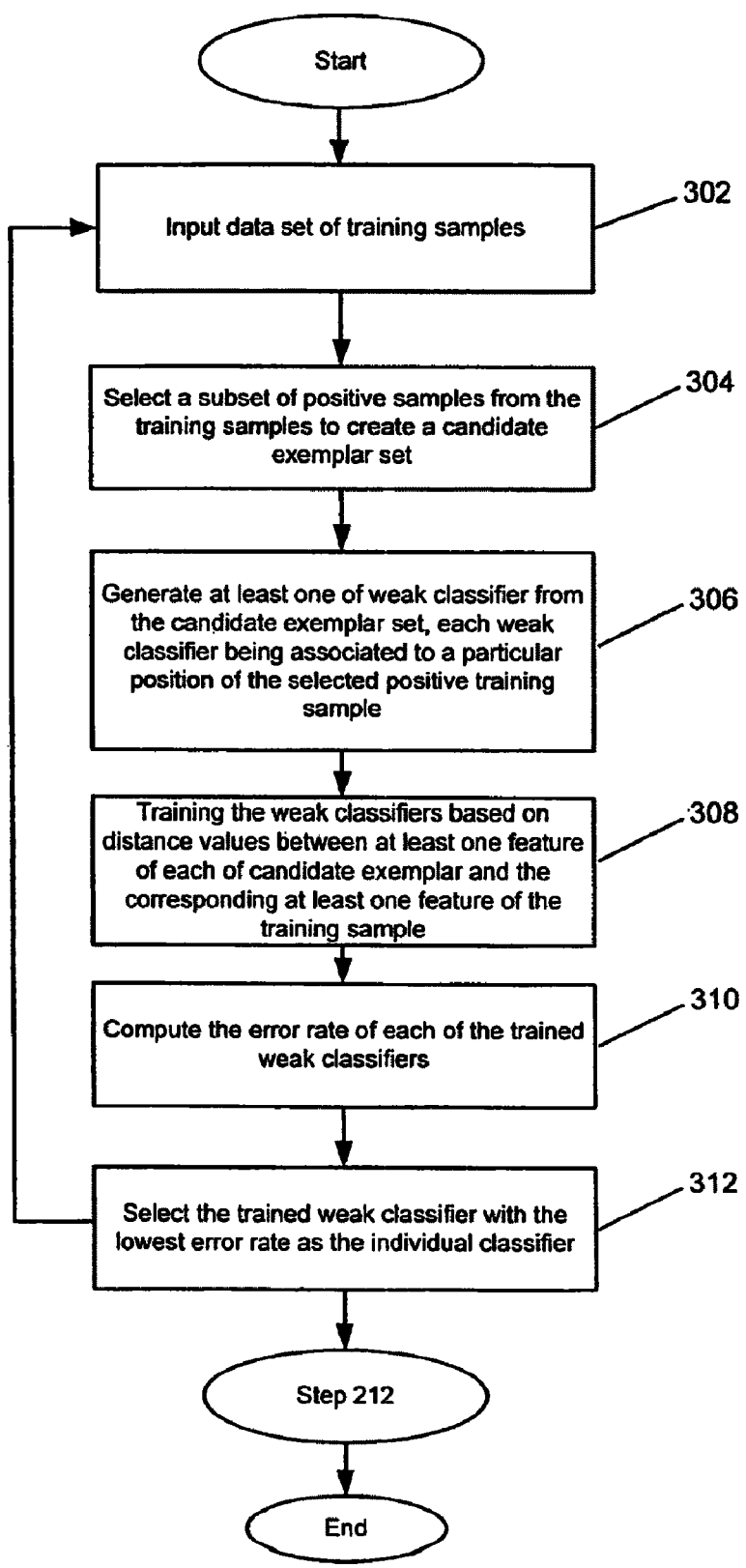
FIG. 3A and FIG. 3B illustrates a flow diagram of the framework of FIG. 2 in accordance with the present invention.
Figure 3B:
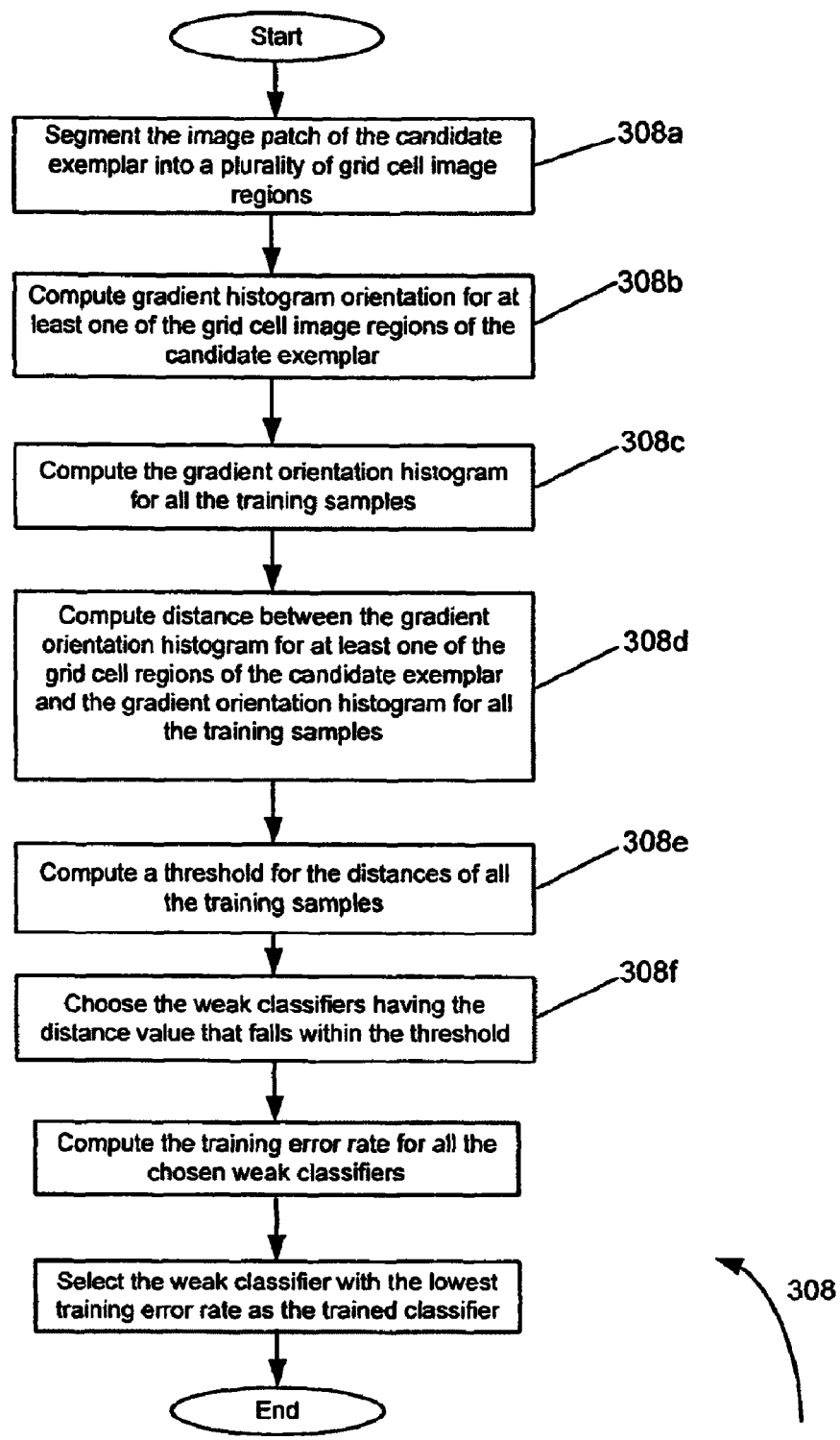

Referring to FIG. 3A and FIG. 3B, there is shown a flow diagram describing in further details of the computational framework 200 of FIG. 2. The process begins in FIG. 3A with step 302 of inputting a data set consisting of training samples, which are image patches. For example, an image patch may include a sample object having a size of 128×64 pixels. Some of these samples, for example, may contain vehicles (an example of an object to be detected) as shown in FIG. 2 and are thus referred to as positive samples, while some samples do not contain vehicles and are thus known as the negative samples. In the next step 304, a subset of positive samples is randomly selected from all the training samples to create a candidate exemplar set. Thus, these exemplars are some special positive training samples or prototypes, for example, a frontal view of the person or a side view of the vehicle, i.e. the exemplar is a whole object. Then at step 306, a set of weak classifiers is generated from this candidate exemplar set, each classifier being associated to a particular position of training samples. These weak classifiers are selected based on the view/pose of the object, such as front view, rear view, side view etc. of the object such as a person or a vehicle. Thus, each weak classifier can recognize the object from one specific pose or aspect. Each of the weak classifiers is selected based on the performance of its corresponding weak classifier. In other words, each of the weak classifiers is generated or selected using one exemplar, one image patch of a specific pose of, for example, a person or vehicle. As shown in process action 308, the weak classifiers are trained based on each candidate exemplar to classify the positive training samples. The details of the process at step 308 which is the inner Adaboost loop 206, is described herein below with reference to FIG. 3B.

The process action 308 involves segmenting the image patch of the candidate exemplar, for example, 128×64 size image patch into a number of 8×8 grid cell image regions at step 308a. For each 8×8 grid cell, a gradient orientation histogram is computed in step 308b. The gradient orientation histogram is computed based on a degree, i.e. angle value of each of the 64 pixels in the 8×8 cell image. Thus, 128 features are obtained for this given exemplar sample. Additionally, a gradient histogram orientation is computed at step 308c for all of the training samples that were inputted in the data set. Then, at step 308d, the distance between the gradient orientation histogram for the 8×8 grid cell of the exemplar and the gradient orientation histogram for all of the training samples is computed. This distance is a histogram value itself and is a comparison between the feature of the object in a particular location (ex: upper left corner) of the 8×8 grid cell with the features of the object in same particular location of the training samples. This particular location may for example contain a feature such as a frontal human face or a front wheel of the vehicle etc. As a result, the distance is a comparison between a particular feature of an object with the computed value of the grid cell (8×8) with all the training samples which were in the input data set. Any effective feature such as frontal face or front wheel on this exemplar will have relatively small distances to the corresponding feature of the training samples, while having large distances to those on the side faces and background images. Similar reasoning also applies to other features of human face such as the side faces, back faces etc or that of a vehicle such as the door of the vehicle, a back bumper of the vehicle etc. The steps 308b through 308d are repeated for each 8×8 grid cell in the 128×8 image patch to obtain all the weak classifiers corresponding to the other features such as human legs, stomach etc. or front bumper, windshield etc. of the vehicle. Note that the gradient histogram is one example of the approach disclosed to be computed in the present invention. It is important to note that instead of the gradient histogram, edge detection or any other methods known in the art can be computed.

Once all the distance values are obtained corresponding to their features, a threshold is computed at step 308e. The distance values will include values for both the positive and negative samples and a threshold will be obtained based on the distance values for all positive and negative samples. Therefore, each of the distance values is used as the training data and one weak classifier is obtained for each distance value corresponding to their current feature that falls within the threshold at step 308f. Then, at step 308g, a training error rate is computed for all the obtained weak classifiers and the weak classifier with the lowest error rate is chosen as the trained weak classifier in step 308h. This training error rate is computed based on the specific position, i.e. the view/pose to be selected for the weak classifiers. For example, if the candidate exemplar includes the position as a front view of the vehicle, then all the vehicles having a front view will have the lowest training error rate and thus will be selected as the trained weak classifier in the step 308h. Again, steps 308a through 308h are repeated for all the different candidate exemplars to include all views/poses of the object to be detected.

Referring back to FIG. 3A, an error rate is further computed at step 310 for all the trained weak classifiers obtained in the process action 308. Then, at step 312, the trained weak classifier with the lowest error rate is selected as the discriminative/individual exemplar. This error rate is computed based on which vehicle to choose from all the trained weak classifiers containing the vehicles having that specific pose/view. For example, if the candidate exemplar includes the vehicle having the front view with the specific feature such as front bumper, front headlights, front windshield etc. as discussed above, then the vehicle (i.e. trained weak classifier) with these features will have the lowest error rate and thus will be selected as the individual/discriminative exemplar. Note that the front view is chosen as one of the examples of the view/pose of the object to be detected. Similarly, other views such as rear view, side view, etc. can also be chosen to obtain a multi-view/multi-pose of the objects. Thus, the steps 302 through 312 are repeated for obtaining the final classifier for other views/poses of the object.

Then, after obtaining the individual classifiers with the lowest rate (step 312) for a specific pose corresponding to specific parts of an object such as a human or a vehicle, these classifiers are combined into a final classifier at step 212 of FIG. 2. For example if the given exemplars in algorithm 1 includes the front, back and side view of the vehicle as shown in FIG. 2, with the features selected as wheels, front bumper, windshield, side doors, back bumper etc for weak classifier with the their corresponding views in the algorithm 2, the final classifier will be the combinations of all the features with their corresponding views. Thus, the final classifier will be the multi-view/multi-pose object, (i.e. the vehicle in this example) to be detected.

More specifically, the details of the outer Adaboost loop, which is learning strong classifier and discriminative exemplars is described in Algorithm 1 as follows:

| ALGORITHM 1 Learning Strong Classifier and Discriminative Exemplars |
| --- |
| Input: Candidate exemplar set $B_c = \{(I_j^c, y_j^c)\}$, and sample set $B_s = \{(I_i^s, y_i^s)\}$, where $B_c \cap B_s = B$. |
| 1: Initialize sample weights $\omega_{1,i} = \frac{1}{2m_s}, \frac{1}{2n_s}$, for $y_j^s = 0, 1$ respectively, where $m_s$ and $n_s$ are the number of positives and negatives respectively. |
| 2: for $t = 1, \ldots, T$ do |
| 3:   Normalize the weights: $w_{t,i} \leftarrow w_{t,i} / \Sigma_{j=1}^l w_{t,j}$ |
| 4:   for each candidate exemplar $c = 1, \ldots, l_c$ do |
| 5:     Train an exemplar-based classifier $f(I; \Theta_c)$ as in Algorithm 2. |
| 6:     Computer error rate $\epsilon_c = \Sigma_i wt_{,i} |f(I; \Theta_c) - y_i^s|$. |
| 7:   end for |
| 8:   Choose $f(I; \Theta_t)$ to be the classifier with the lowest error $\epsilon_t$ |
| 9: Update the weights: $w_t + 1, i \leftarrow w_{t,i} \beta_t^{1-e_i}$, where $\beta_t = \frac{\epsilon_t}{1-\epsilon_t}$, and $e_i = 0, 1$ for incorrect classification and correct classification respectively. |
| 10: end for |
| Output: The set of discriminative exemplars $E = \{E_t\}_1^T$, and the strong classifier $\sum_{t=1}^T \alpha_t f(I; \Theta_t)$, where $\alpha_t = \log \frac{1}{\beta_t}$. |

As indicated in Algorithm 1 above, the input of the outer Adaboost loop is a candidate exemplar set $B_c$ and a sample set $B_s$. The samples in $B_c$ are randomly selected and removed from the original set B which contains the remaining samples. The output of the algorithm is the strong classifier and the discriminative exemplar set $\epsilon$, which is the subset of $B_c$. Steps 1 to 3 and 8 to 10 are the standard Adaboost steps initializing and updating sample weights, and combining the weak classifiers into strong classifiers according to the training error of the best weak classifier f at each iteration t. Steps 4 to 7 iterate through all the candidate exemplars, compute a weak classifier based on each exemplar and compute the training error rate for each classifier.

Beginning with step 1 in Algorithm 1, sample weights are initialized which will be used later to compute the error rate for each classifier. Then at step 2, the main loop is to select T exemplars or equivalently T weak classifier from the candidate exemplar set $B_c$ since each exemplar is used to build a weak classifier and the selection decision of one exemplar is based on the performance of its corresponding weak classifier. T is experimentally decided by the training error of the final strong classifier, which is a combination of the T weaker classifiers.

In step 3, weights of all the training samples are normalized. Since all the weights at step 9 are updated, they need to be normalized in a new iteration. Then beginning with step 4, the loop to train weak classifiers is started based on each candidate exemplar. The training errors of these weak classifiers will be used to select one discriminative exemplar from candidate exemplar set. At step 5, the current exemplar is used in the loop to train a weak classifier which is detailed in the Algorithm 2 below. Then at step 6, the training error rate of the weak classifier obtained in step 5 is computed. The loop from step 4 ends at step 7. After computing the training error rates for all the weak classifiers, the weak classifier with the lowest error rate is selected in step 8 as the discriminative exemplar in the current main loop (i.e. starting from step 2). Then at step 9, the weights of the training samples are updated based on whether they are classified correctly or not by the selected weak classifier in step 8. Finally, step 10 is the end of the loop from step 2.

More specifically, the details of the inner Adaboost loop, which is learning a weak classifier using the selected exemplar from the outer Adaboost loop, are described in Algorithm 2 as follows:

| Algorithm 2 Learning Exemplar-based Classifier |
| --- |
| Input: Exemplar $E_c$ selected in the $4^{th}$ step of Algorithm 1, and the sample set $B_s = \{(I_i^s, y_i^s)\}$. |
| 1: Initialize sample weights $w'_{1,i} = \frac{1}{2m_i}, \frac{1}{2n_s}$. |
| 2: for $\tau = 1, \ldots, T_c$ do |
| 3:   Normalize the weights: $w'_{\tau,i} \leftarrow w'_{\tau,i} / \Sigma_{j=1}^l w'_{\tau,j}$ |
| 4:   for each feature $b = 1, \ldots, O_c$ of the exemplar do |
| 5:     Train a classifier $g(I; s_b^c, \lambda_b^c)$ based on the distances $d_b$ from the exemplar feature $s_b^c$ to the corresponding features of all the samples in $B_s$. |

-continued

Algorithm 2 Learning Exemplar-based Classifier

6: Compute $\epsilon_b' = \Sigma_i w_{\tau,i}' |g(I; s_b^c \lambda_b^c) - y_i^s|$.
7: end for
8: Choose $g(I; s_\tau^c, \lambda_\tau^c)$ to be the classifier with the lowest error $\epsilon_\tau'$.
9: Update the weights: $w_{\tau+1,i}' \leftarrow w_{\tau,i}' \beta_\tau'^{1-e_i}$, where $\beta_\tau' = \dfrac{\epsilon_\tau'}{1 - \epsilon_\tau'}$.
10: end for Output: The exemplar-based classifier for $E_c$ as in (5):

$$\sum_{\tau=1}^{T_c} \gamma_\tau^c g(I; s_\tau^c, \lambda_\tau^c), \text{ where } \gamma_\tau = \log\dfrac{1}{\beta_\tau'}.$$

Algorithm 2 is similar in formality to the standard Adaboost approach proposed in the prior art, except for one major difference. In the standard Adaboost algorithm, the weak classifier is trained based on image features extracted from each individual training image. Instead in algorithm 2 of the present invention, the classification function g is trained based on the distances $d_b$ between features on the exemplar and their corresponding features on the training samples. The output of this process is the exemplar-based classifier $f(I; \Theta_c)$ for the hypothetical $E_c$.

Algorithm 2 builds a weak classifier with the image features in the c th candidate exemplar $E_c$ in the $4^{th}$ step of algorithm 1. Note in algorithm 2, $E_c$ is a hypothetical exemplar, instead of E th which is the optimal exemplar selected at the t th iteration in Algorithm 1. Algorithm 2 is called by the main algorithm 1 to train a weak classifier to classify the training samples in step 1 of the algorithm 1 by using the current exemplar in step 5 of the algorithm 1. Algorithm 2 runs in the same spirit as that of algorithm 1, except for the big difference in step 5 of algorithm 2. In this step 5, there is no sub-procedure to call as in step 5 of algorithm 1. Using the above 128 features as example, the step 5 of algorithm 2 runs as following:

1) Assume the current feature F is from the grid at i-th row and j-th column;
2) Compute the same feature for all the training samples in algorithm 1, which are the input for algorithm 2. Denote these features as Fi;
3) Compute the distance between F and Fi based on some metric, which is denoted as di;
4) Select one threshold by using di as training data and thus obtain one classifier corresponding to current feature F.

Although various embodiments that incorporate the teachings of the present invention have been shown and described in detail herein, those skilled in the art can readily devise many other varied embodiments that still incorporate these teachings without departing from the spirit and the scope of the invention.

The invention claimed is:

1. A computer implemented method of training an image classifier comprising:
   segmenting a candidate exemplar into a number of grid cell image regions;
   computing a gradient orientation histogram for at least one of the grid cell image regions of the candidate exemplar, where the candidate exemplar comprises at least one image of an object to be detected;
   computing a gradient orientation histogram for a plurality of training samples;
   calculating a distance value between the gradient orientation histogram for at least one of the grid cell image regions of the candidate exemplar and the gradient orientation histogram for the plurality of training samples; and
   training the image classifier based on the distance value.

2. The method of claim 1 wherein the plurality of training samples include additional images of the at least one object to be detected.

3. The method of claim 2 further comprising randomly selecting a subset of positive samples from the plurality of training samples to create the candidate exemplar, wherein the positive training samples comprise images of an object to be detected using the trained image classifier.

4. The method of claim 1 wherein said distance value represents commonality of image features between the candidate exemplar and the plurality of training samples.

5. The method of claim 1 wherein the classifier is a weak classifier.

6. The method of claim 5 further comprising a plurality of weak classifiers and, after being trained, combining the plurality of weak classifiers to form a final classifier.

7. The method of claim 5 wherein the final classifier represents a multi-view, multi-pose object to be detected.

8. A computer implemented method of training and using a plurality of weak classifiers to form an image classifier comprising:
   segmenting a candidate exemplar into a plurality of grid cell image regions, where the candidate exemplar comprises at least one image of an object to be detected;
   computing a gradient orientation histogram for at least one of the grid cell image regions of the candidate exemplar;
   computing a gradient orientation histogram for a plurality of training samples;
   calculating a distance value between the gradient orientation histogram for the at least one of the grid cell image regions of the candidate exemplar and the gradient orientation histogram for the plurality of training samples; and
   training the plurality weak classifiers based on the distance value.

9. The method of claim 8 wherein the plurality of training samples include additional images of the at least one object to be detected.

10. The method of claim 8 further comprising randomly selecting a subset of positive samples from the plurality of training samples to create the candidate exemplar, wherein the positive training samples comprise images of an object to be detected using the trained image classifier.

11. The method of claim 8 wherein the distance value represents commonality of image features between the candidate exemplar and the plurality of training samples.

12. The method of claim 8 further comprising:
   computing error rates for each of the trained weak classifiers;
   selecting the trained weak classifier with the lowest error rate as an individual classifier;
   continuing to train the weak classifiers until all of the weak classifiers in the plurality of weak classifiers have been selected as an individual classifier;
   combining the individual classifiers into a final classifier, wherein said final classifier is the object to be detected.

13. The method of claim 12 wherein the plurality of weak classifiers are generated based on a location of the corresponding weak classifier to recognize the object.

14. The method of claim 13 wherein the weak classifier is trained as:

$$\epsilon'_b = \Sigma_i w'_{\tau,i} |g(I; s_b^c, \lambda_b^c) - y_i^s|.$$

wherein the weak classifier $g(I; s_b^c, \lambda_b^c)$ is trained based on the distance value $d_b$ from an image feature of the candidate exemplar $s_b^c$ to the corresponding image feature of all the training samples in $B_s$.

15. The method of claim 8 further comprising, after being trained, combining the plurality of weak classifiers to form a final classifier.

16. The method of claim 15 wherein the final classifier represents a multi-view, multi-pose object to be detected.

17. Apparatus for training and using a plurality of weak classifiers to form an image classifier comprising:
   a plurality of weak classifiers, where each weak classifier in the plurality of weak classifiers is trained using a first gradient orientation histogram representation of a candidate exemplar and a second gradient orientation histogram representing a plurality of training samples, where the candidate exemplar comprises positive samples of images of an object to be detected; and
   a combiner, coupled to the plurality of weak classifiers, for linearly combining the plurality of weak classifiers to form a final classifier.

18. The apparatus of claim 17 wherein each weak classifier comprises an AdaBoost loop.

19. The apparatus of claim 17 wherein the final classifier represents a multi-view, multi-pose object to be detected.

* * * * *